United States Patent
Morin et al.

(10) Patent No.: US 12,526,690 B2
(45) Date of Patent: Jan. 13, 2026

(54) SAMPLED SUBSCRIBER CONGESTION CONTROL

(71) Applicant: Nokia Solutions and Networks Oy, Espoo (FI)

(72) Inventors: Steve Morin, Ottawa (CA); Safa Almalki, Nepean (CA)

(73) Assignee: Nokia Solutions and Networks Oy, Espoo (FI)

( * ) Notice: Subject to any disclaimer, the term of this patent is extended or adjusted under 35 U.S.C. 154(b) by 376 days.

(21) Appl. No.: 18/184,909

(22) Filed: Mar. 16, 2023

(65) Prior Publication Data

US 2024/0314629 A1  Sep. 19, 2024

(51) Int. Cl.
| | |
|---|---|
| *H04W 28/02* | (2009.01) |
| *H04L 41/0894* | (2022.01) |
| *H04L 43/022* | (2022.01) |
| *H04L 43/026* | (2022.01) |
| *H04L 47/70* | (2022.01) |
| *H04W 28/12* | (2009.01) |

(52) U.S. Cl.
CPC ... *H04W 28/0289* (2013.01); *H04W 28/0284* (2013.01)

(58) Field of Classification Search
CPC ... H04L 47/822; H04L 47/828; H04L 43/022; H04L 43/026; H04L 41/0894; H04W 28/0289; H04W 28/0284
See application file for complete search history.

(56) References Cited

U.S. PATENT DOCUMENTS

| | | | | |
|---|---|---|---|---|
| 10,091,113 B2 * | 10/2018 | Shaw | ............ | H04L 41/0894 |
| 10,187,819 B2 * | 1/2019 | Zhou | ............ | H04L 47/83 |
| 10,785,678 B2 * | 9/2020 | Sun | ............ | H04W 72/23 |
| 10,873,533 B1 * | 12/2020 | Ismailsheriff | ...... | H04L 47/2441 |
| 11,553,370 B2 * | 1/2023 | Arora | ............ | H04W 28/0268 |
| 11,729,469 B2 * | 8/2023 | Lesser | ............ | H04N 21/440263 |
| | | | | 725/31 |
| 11,968,226 B1 * | 4/2024 | Chychi | ............ | H04L 63/0236 |
| 2012/0257499 A1 | 10/2012 | Chatterjee et al. | | |
| 2014/0341025 A1 * | 11/2014 | Denman | ............ | H04L 43/08 |
| | | | | 370/230.1 |
| 2016/0127238 A1 * | 5/2016 | McCollum | ............ | H04L 47/10 |
| | | | | 709/224 |
| 2021/0112436 A1 * | 4/2021 | Hoffner | ............ | H04L 41/5025 |

FOREIGN PATENT DOCUMENTS

JP  2018503306 A  2/2018

OTHER PUBLICATIONS

Notice of Reasons for Refusal (including translation), Application No. 2024-036612, proposed on Jul. 23, 2025, 5 pages.

* cited by examiner

*Primary Examiner* — Jenee Holland

(74) *Attorney, Agent, or Firm* — Tong, Rea, Bentley & Kim, LLC

(57) ABSTRACT

Various example embodiments for supporting subscriber sampled congestion control are presented herein. Various example embodiments for supporting subscriber sampled congestion control may be configured to support subscriber sampled congestion control by triggering monitoring of a subset of subscriber devices of an access network area for detecting congestion in the access network area and triggering application of a congestion control policy for the access network area based on detection of congestion in the access network area.

19 Claims, 6 Drawing Sheets

SAMPLED SUBSCRIBER CONGESTION CONTROL

TECHNICAL FIELD

Various example embodiments relate generally to communication systems and, more particularly but not exclusively, to congestion control in communication systems.

BACKGROUND

In communication networks, various communications technologies may be used to support various types of communications.

SUMMARY

In at least some example embodiments, an apparatus includes at least one processor and at least one memory including instructions that, when executed by the at least one processor, cause the apparatus at least to send an indication of a subset of subscriber devices, from a set of subscriber devices associated with an access network area, to be monitored for congestion, receive an indication of a change of a congestion state for the access network area, and send an indication of a congestion management policy to be applied for the set of subscriber devices associated with the access network area. In at least some example embodiments, the subset of subscriber devices to be monitored for congestion is determined based on at least one of a quantity of subscriber devices to be monitored or a quantity of traffic to be monitored. In at least some example embodiments, the indication of the change of the congestion state for the access network area includes an identifier of the access network area. In at least some example embodiments, the instructions, when executed by the at least one processor, cause the apparatus at least to identify, based on the identifier of the access network area, the subscriber devices in the set of subscriber devices associated with the access network area. In at least some example embodiments, the indication of the change of the congestion state for the access network area includes an identifier of one of the subscriber devices in the subset of subscriber devices for which congestion was detected. In at least some example embodiments, the instructions, when executed by the at least one processor, cause the apparatus at least to identify, based on the identifier of one of the subscriber devices in the subset of subscriber devices for which congestion was detected, the access network area. In at least some example embodiments, the indication of the congestion management policy to be applied for the set of subscriber devices associated with the access location includes an indication of the access network area. In at least some example embodiments, the indication of the congestion management policy to be applied for the set of subscriber devices associated with the access network area includes, for each of the subscriber devices in the set of subscriber devices associated with the access network area, a respective identifier of the respective subscriber devices in the set of subscriber devices associated with the access network area.

In at least some example embodiments, a non-transitory computer readable medium includes computer program instructions that, when executed by an apparatus, cause the apparatus at least to send an indication of a subset of subscriber devices, from a set of subscriber devices associated with an access network area, to be monitored for congestion, receive an indication of a change of a congestion state for the access network area, and send an indication of a congestion management policy to be applied for the set of subscriber devices associated with the access network area. In at least some example embodiments, the subset of subscriber devices to be monitored for congestion is determined based on at least one of a quantity of subscriber devices to be monitored or a quantity of traffic to be monitored. In at least some example embodiments, the indication of the change of the congestion state for the access network area includes an identifier of the access network area. In at least some example embodiments, the computer program instructions, when executed by the apparatus, cause the apparatus at least to identify, based on the identifier of the access network area, the subscriber devices in the set of subscriber devices associated with the access network area. In at least some example embodiments, the indication of the change of the congestion state for the access network area includes an identifier of one of the subscriber devices in the subset of subscriber devices for which congestion was detected. In at least some example embodiments, the computer program instructions, when executed by the apparatus, cause the apparatus at least to identify, based on the identifier of one of the subscriber devices in the subset of subscriber devices for which congestion was detected, the access network area. In at least some example embodiments, the indication of the congestion management policy to be applied for the set of subscriber devices associated with the access location includes an indication of the access network area. In at least some example embodiments, the indication of the congestion management policy to be applied for the set of subscriber devices associated with the access network area includes, for each of the subscriber devices in the set of subscriber devices associated with the access network area, a respective identifier of the respective subscriber devices in the set of subscriber devices associated with the access network area.

In at least some example embodiments, a method includes sending an indication of a subset of subscriber devices, from a set of subscriber devices associated with an access network area, to be monitored for congestion, receiving an indication of a change of a congestion state for the access network area, and sending an indication of a congestion management policy to be applied for the set of subscriber devices associated with the access network area. In at least some example embodiments, the subset of subscriber devices to be monitored for congestion is determined based on at least one of a quantity of subscriber devices to be monitored or a quantity of traffic to be monitored. In at least some example embodiments, the indication of the change of the congestion state for the access network area includes an identifier of the access network area. In at least some example embodiments, the method includes identifying, based on the identifier of the access network area, the subscriber devices in the set of subscriber devices associated with the access network area. In at least some example embodiments, the indication of the change of the congestion state for the access network area includes an identifier of one of the subscriber devices in the subset of subscriber devices for which congestion was detected. In at least some example embodiments, the method includes identifying, based on the identifier of one of the subscriber devices in the subset of subscriber devices for which congestion was detected, the access network area. In at least some example embodiments, the indication of the congestion management policy to be applied for the set of subscriber devices associated with the access location includes an indication of the access network area. In at least some example embodiments, the indication of the congestion management policy to be applied for the set of subscriber devices associated with the access network area includes, for each of the subscriber devices in the set of subscriber devices associated with the access network area, a respective identifier of the respective subscriber devices in the set of subscriber devices associated with the access network area.

In at least some example embodiments, an apparatus includes means for sending an indication of a subset of subscriber devices, from a set of subscriber devices associated with an access network area, to be monitored for congestion, means for receiving an indication of a change of a congestion state for the access network area, and means for sending an indication of a congestion management policy to be applied for the set of subscriber devices associated with the access network area. In at least some example embodiments, the subset of subscriber devices to be monitored for congestion is determined based on at least one of a quantity of subscriber devices to be monitored or a quantity of traffic to be monitored. In at least some example embodiments, the indication of the change of the congestion state for the access network area includes an identifier of the access network area. In at least some example embodiments, the apparatus includes means for identifying, based on the identifier of the access network area, the subscriber devices in the set of subscriber devices associated with the access network area. In at least some example embodiments, the indication of the change of the congestion state for the access network area includes an identifier of one of the subscriber devices in the subset of subscriber devices for which congestion was detected. In at least some example embodiments, the apparatus includes means for identifying, based on the identifier of one of the subscriber devices in the subset of subscriber devices for which congestion was detected, the access network area. In at least some example embodiments, the indication of the congestion management policy to be applied for the set of subscriber devices associated with the access location includes an indication of the access network area. In at least some example embodiments, the indication of the congestion management policy to be applied for the set of subscriber devices associated with the access network area includes, for each of the subscriber devices in the set of subscriber devices associated with the access network area, a respective identifier of the respective subscriber devices in the set of subscriber devices associated with the access network area.

In at least some example embodiments, an apparatus includes at least one processor and at least one memory including instructions that, when executed by the at least one processor, cause the apparatus at least to receive an indication of a subset of subscriber devices, from a set of subscriber devices associated with an access network area, to be monitored for congestion, initiate congestion monitoring for the subset of subscriber devices to be monitored for congestion, send an indication of a change of a congestion state for the access network area, and receive an indication of a congestion management policy to be applied for the set of subscriber devices associated with the access network area. In at least some example embodiments, to initiate congestion monitoring for the subset of subscriber devices to be monitored for congestion, the instructions, when executed by the at least one processor, cause the apparatus at least to divert, toward a congestion monitoring element, a set of traffic flows of the subset of subscriber devices to be monitored for congestion. In at least some example embodiments, the apparatus comprises a network device, and the congestion monitoring element is disposed on the network device. In at least some example embodiments, the apparatus comprises a network device, and the congestion monitoring element includes an extended services appliance associated with the network device. In at least some example embodiments, the indication of the subset of subscriber devices to be monitored for congestion is received from a policy manager, the indication of the change of the congestion state for the access network area is sent toward the policy manager, and the indication of the congestion management policy to be applied for the set of subscriber devices associated with the access network area is received from the policy manager. In at least some example embodiments, the policy manager comprises at least one of a policy and charging rules functions, an authentication, authorization, and accounting server, or a policy decision engine of a network management layer or a subscriber management platform. In at least some example embodiments, the instructions, when executed by the at least one processor, cause the apparatus at least to perform at least one congestion control function for at least one of the subscriber devices in the set of subscriber devices associated with the access network area. In at least some example embodiments, the congestion management policy includes at least one of a traffic management policy, a bearer management policy, a flow-aware management policy, or an application-aware management policy.

In at least some example embodiments, a non-transitory computer readable medium includes computer program instructions that, when executed by an apparatus, cause the apparatus at least to receive an indication of a subset of subscriber devices, from a set of subscriber devices associated with an access network area, to be monitored for congestion, initiate congestion monitoring for the subset of subscriber devices to be monitored for congestion, send an indication of a change of a congestion state for the access network area, and receive an indication of a congestion management policy to be applied for the set of subscriber devices associated with the access network area. In at least some example embodiments, to initiate congestion monitoring for the subset of subscriber devices to be monitored for congestion, the computer program instructions, when executed by the apparatus, cause the apparatus at least to divert, toward a congestion monitoring element, a set of traffic flows of the subset of subscriber devices to be monitored for congestion. In at least some example embodiments, the apparatus comprises a network device, and the congestion monitoring element is disposed on the network device. In at least some example embodiments, the apparatus comprises a network device, and the congestion monitoring element includes an extended services appliance associated with the network device. In at least some example embodiments, the indication of the subset of subscriber devices to be monitored for congestion is received from a policy manager, the indication of the change of the congestion state for the access network area is sent toward the policy manager, and the indication of the congestion management policy to be applied for the set of subscriber devices associated with the access network area is received from the policy manager. In at least some example embodiments, the policy manager comprises at least one of a policy and charging rules functions, an authentication, authorization, and accounting server, or a policy decision engine of a network management layer or a subscriber management platform. In at least some example embodiments, the computer program instructions, when executed by the apparatus, cause the apparatus at least to perform at least one congestion control function for at least one of the subscriber devices in the set of subscriber devices associated with the access network area. In at least some example embodiments, the congestion management policy includes at least one of a traffic management policy, a bearer management policy, a flow-aware management policy, or an application-aware management policy.

In at least some example embodiments, a method includes receiving an indication of a subset of subscriber devices, from a set of subscriber devices associated with an access network area, to be monitored for congestion, initiating congestion monitoring for the subset of subscriber devices to be monitored for congestion, sending an indication of a change of a congestion state for the access network area, and receiving an indication of a congestion management policy to be applied for the set of subscriber devices associated with the access network area. In at least some example embodiments, initiating congestion monitoring for the subset of subscriber devices to be monitored for congestion includes diverting, toward a congestion monitoring element, a set of traffic flows of the subset of subscriber devices to be monitored for congestion. In at least some example embodiments, the method is executed by a network device, and the congestion monitoring element is disposed on the network device. In at least some example embodiments, the method is executed by a network device, and the congestion monitoring element includes an extended services appliance associated with the network device. In at least some example embodiments, the indication of the subset of subscriber devices to be monitored for congestion is received from a policy manager, the indication of the change of the congestion state for the access network area is sent toward the policy manager, and the indication of the congestion management policy to be applied for the set of subscriber devices associated with the access network area is received from the policy manager. In at least some example embodiments, the policy manager comprises at least one of a policy and charging rules functions, an authentication, authorization, and accounting server, or a policy decision engine of a network management layer or a subscriber management platform. In at least some example embodiments, the method includes performing at least one congestion control function for at least one of the subscriber devices in the set of subscriber devices associated with the access network area. In at least some example embodiments, the congestion management policy includes at least one of a traffic management policy, a bearer management policy, a flow-aware management policy, or an application-aware management policy.

In at least some example embodiments, an apparatus includes means for receiving an indication of a subset of subscriber devices, from a set of subscriber devices associated with an access network area, to be monitored for congestion, means for initiating congestion monitoring for the subset of subscriber devices to be monitored for congestion, means for sending an indication of a change of a congestion state for the access network area, and means for receiving an indication of a congestion management policy to be applied for the set of subscriber devices associated with the access network area. In at least some example embodiments, the means for initiating congestion monitoring for the subset of subscriber devices to be monitored for congestion includes means for diverting, toward a congestion monitoring element, a set of traffic flows of the subset of subscriber devices to be monitored for congestion. In at least some example embodiments, the apparatus comprises a network device, and the congestion monitoring element is disposed on the network device. In at least some example embodiments, the apparatus comprises a network device, and the congestion monitoring element includes an extended services appliance associated with the network device. In at least some example embodiments, the indication of the subset of subscriber devices to be monitored for congestion is received from a policy manager, the indication of the change of the congestion state for the access network area is sent toward the policy manager, and the indication of the congestion management policy to be applied for the set of subscriber devices associated with the access network area is received from the policy manager. In at least some example embodiments, the policy manager comprises at least one of a policy and charging rules functions, an authentication, authorization, and accounting server, or a policy decision engine of a network management layer or a subscriber management platform. In at least some example embodiments, the apparatus includes means for performing at least one congestion control function for at least one of the subscriber devices in the set of subscriber devices associated with the access network area. In at least some example embodiments, the congestion management policy includes at least one of a traffic management policy, a bearer management policy, a flow-aware management policy, or an application-aware management policy.

In at least some example embodiments, an apparatus includes at least one processor and at least one memory including instructions that, when executed by the at least one processor, cause the apparatus at least to receive, by an extended services appliance, a set of traffic flows of a subset of subscriber devices from a set of subscriber devices associated with an access network area, perform, by the extended services appliance based on the traffic flows, congestion monitoring for the subset of subscriber devices, and send, by the extended services appliance based on detection of congestion associated with at least one of subscriber devices in the subset of subscriber devices, an indication that the access network area is experiencing congestion. In at least some example embodiments, a non-transitory computer readable medium includes computer program instructions that, when executed by an apparatus, cause the apparatus at least to receive, by an extended services appliance, a set of traffic flows of a subset of subscriber devices from a set of subscriber devices associated with an access network area, perform, by the extended services appliance based on the traffic flows, congestion monitoring for the subset of subscriber devices, and send, by the extended services appliance based on detection of congestion associated with at least one of subscriber devices in the subset of subscriber devices, an indication that the access network area is experiencing congestion. In at least some example embodiments, a method includes receiving, by an extended services appliance, a set of traffic flows of a subset of subscriber devices from a set of subscriber devices associated with an access network area, performing, by the extended services appliance based on the traffic flows, congestion monitoring for the subset of subscriber devices, and sending, by the extended services appliance based on detection of congestion associated with at least one of subscriber devices in the subset of subscriber devices, an indication that the access network area is experiencing congestion. In at least some example embodiments, an apparatus includes means for receiving, by an extended services appliance, a set of traffic flows of a subset of subscriber devices from a set of subscriber devices associated with an access network area, means for performing, by the extended services appliance based on the traffic flows, congestion monitoring for the subset of subscriber devices, and means for sending, by the extended services appliance based on detection of congestion associated with at least one of subscriber devices in the subset of subscriber devices, an indication that the access network area is experiencing congestion.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
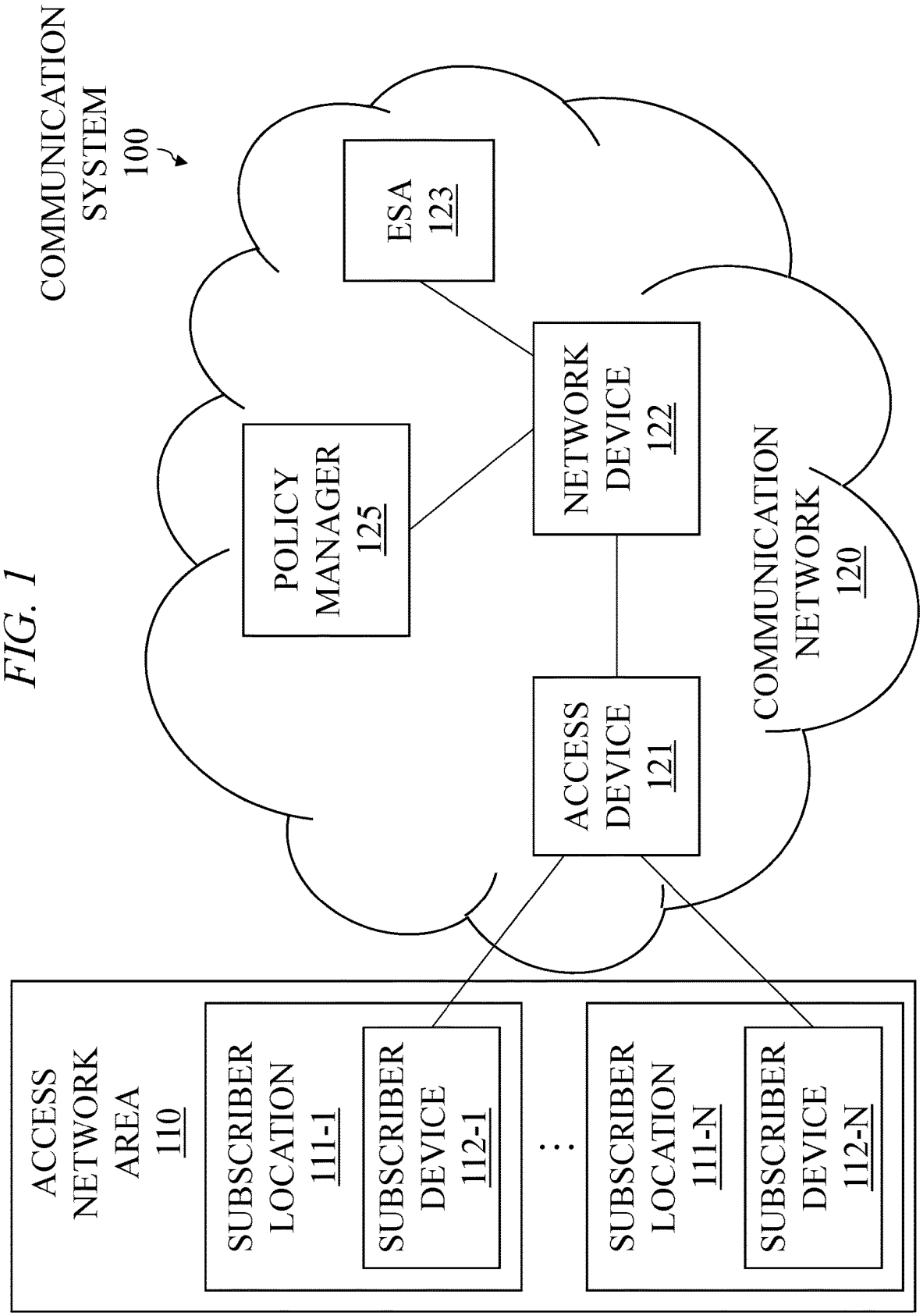
FIG. 1 depicts an example embodiment of a communication system configured to support embodiments of subscriber sampled congestion control.

Various example embodiments for supporting subscriber sampled congestion control are presented herein. Various example embodiments for supporting subscriber sampled congestion control may be configured to support cost-effective traffic management based on support for cost-effective congestion control that includes cost-effective congestion detection and cost-effective congestion mitigation (e.g., enabling network operators to cost-effectively manage network congestion, despite the ongoing rapid growth in access bandwidth and associated traffic volumes, within the context of a business model that generally cannot justify funding traffic management costs that increase as a result of continually increasing traffic volumes). Congestion control based on subscriber sampled congestion control may use a subset of subscriber devices and total traffic, from a shared area of an access network that may experience congestion, to measure the performance of the shared area of the access network and, thus, the congestion state of the shared access resources of the shared area of the access network. This allows congestion detection to be provided in a shared network area in a manner in which the volume of traffic to be processed may be made independent of the traffic volume within the shared network area and, thus, in which the cost of supporting congestion detection also may be made independent of the traffic volume within the shared network area. Further, congestion mitigation for the identified congested resources may be provided using various congestion mitigation techniques (e.g., a cost-effective Layer 2 (L2)-Layer (L4) subscriber/bearer traffic management policy, a Layer 7 (L7) flow-aware and/or application-aware policy, or a mix of the two approaches depending on the traffic management policy preferences or needs of the operator), thereby enabling control over the cost of mitigation aspects of traffic management and, thus, further improving the cost effectiveness of subscriber sampled congestion control compared to solutions that rely solely on flow-based processing for all traffic in order to support congestion detection and mitigation.

Various example embodiments for supporting subscriber sampled congestion control may be configured to support subscriber sampled congestion control by triggering monitoring of a subset of subscriber devices of an access network area for detecting congestion in the access network area and triggering application of a congestion control policy for the access network area based on detection of congestion in the access network area. For example, various example embodiments for supporting subscriber sampled congestion control may be configured to support subscriber sampled congestion control by determining, from a set of subscriber devices associated with an access network area, a subset of the subscriber devices to be monitored for congestion, sending an indication of the subset of the subscriber devices to be monitored for congestion, receiving an indication of a change of a congestion state for the access network area, and sending an indication of a congestion management policy to be applied for the subscriber devices in the set of subscriber devices associated with the access network area. For example, various example embodiments for supporting subscriber sampled congestion control may be configured to support subscriber sampled congestion control by receiving an indication of a subset of subscriber devices, from a set of subscriber devices associated with an access network area, to be monitored for congestion, initiating congestion monitoring for the subset of subscriber devices to be monitored for congestion, sending an indication of a change of a congestion state for the access network area, and receiving an indication of a congestion management policy to be applied for the set of subscriber devices associated with the access network area. For example, various example embodiments for supporting subscriber sampled congestion control may be configured to support subscriber sampled congestion control by receiving, by an extended services appliance or other suitable element, a set of traffic flows of a subset of subscriber devices from a set of subscriber devices associated with an access network area, performing, by the extended services appliance of other suitable element based on the traffic flows, congestion monitoring for the subset of subscriber devices, and sending, by the extended services appliance or other suitable element based on detection of congestion associated with at least one of subscriber devices in the subset of subscriber devices, an indication that the access network area is experiencing congestion.

It will be appreciated that these and various other example embodiments for supporting subscriber sampled congestion control, and advantages or potential advantages of example embodiments for supporting subscriber sampled congestion control, may be further understood by way of reference to the various figures, which are discussed further below.

FIG. 1 depicts an example embodiment of a communication system configured to support embodiments of subscriber sampled congestion control.

The communication system 100 includes an access network area 110 supported by a communication network 120. The communication network 120 is configured to support communications by various subscriber devices of subscribers associated with the access network area 110.

The access network area 110 may be defined in various ways. The access network area 110 may be defined based on subscriber and traffic segmentation. The access network area 110 may be a geographic area within which communication coverage is provided (e.g., a geographic location served by a set of wired lines from an access point to a set of subscribers, a geographic area within which cellular coverage is supported (typically referred to as a cell), a geographic area within which WiFi coverage is provided, or the like. The access network area 110 may be defined based on an access device serving the access network area 110 (e.g., a cellular base station, a WiFi access point, or the like). The access network area 110 may be defined based on an access location identification (e.g., 3GPP User Location Information (ULI) or other ways in which an access location may be identified or defined). It will be appreciated that the access network area 110 may be defined based on a combination of such bases for definition and/or in various other ways. It is noted that the access network area also may be referred to herein as an access network location (ANL).

The access network area 110 covers a set of subscriber locations 111-1 to 111-N (collectively, subscriber locations 111) having a set of subscriber devices 112-1 to 112-N (collectively, subscriber devices 112), respectively, associated therewith. The subscriber locations 111 may include customer premises at which associated subscriber devices 112 are located (e.g., for wired subscriber devices in a wired network), customer locations of customers carrying subscriber devices (e.g., for wireless subscriber devices in a wireless network), or the like, as well as various combinations thereof. The subscriber devices 112 may include wired subscriber devices, wireless subscriber devices, or the like, as well as various combinations thereof. For example, the subscriber devices 112 may include smartphones, cellular phones, laptop computers, desktop computers, smart televisions, set top boxes, gaming systems, customer premises routers, or the like, as well as various combinations thereof.

The communication network 120 is configured to support communications of the subscriber devices 112 associated with the subscriber locations 111 located within the access network area 110. The communication network 120 may include a wired communication network, a wireless communication network, or the like, as well as combinations thereof. The communication network 120 may support various communications technologies. For example, the communication network 120 may support various wired communications technologies, such as Ethernet network capabilities, optical network capabilities, or the like, as well as various combinations thereof. For example, the communication network 120 may support various wireless communications technologies, such as cellular network capabilities (e.g., Third Generation (3G), Fourth Generation (4G), Fifth Generation (5G), or the like, as well as various combinations thereof), WiFi network capabilities, satellite network capabilities, or the like, as well as various combinations thereof. It will be appreciated that the communication network 120 may support various other communications technologies or combinations of communication technologies.

The communication network 120 includes an access device 121, a network device 122, an extended services appliance 123, and a policy manager 125. It will be appreciated that, although depicted as being standalone devices, at least some of these devices may be combined in various ways (e.g., access device 121 and network device 122 may be combined into a single device, network device 122 and extended services appliance 123 may be combined into a single device, or the like) and may even be combined as elements or functions of a single network element. It will be appreciated that these elements of the communication network 120 may be implemented in various ways, such as by use of physical devices to provide the elements, use of virtualized elements configured to perform the functions of the elements (e.g., based on network function virtualization (NFV) and/or other virtualization techniques), or the like, as well as various combinations thereof. It will be appreciated that, although omitted for purposes clarity, the communication network 120 may include various other elements which may be configured to support communications of the subscriber devices 112 associated with the subscriber locations 111 located within the access network area 110.

The access device 121 is configured to operate as a point of access to the communication network 120 for the access network area 110. The access device 121 is configured to support communications from the access network area 110 and communications to the access network area 110. The access device 121 is configured to serve the subscriber devices 112 associated with the subscriber locations 111 located within the access network area 110. The access device 121 may support access resources (e.g., resources such as bearers, bandwidth, or the like, as well as various combinations thereof) which may be shared by the supported subscriber devices 112 of the access network area 110. The access device 121 may experience congestion depending on consumption of access resources by the subscriber devices 112 associated with the subscriber locations 111 located within the access network area 110.

The access device 121 may be implemented in various ways, which may depend on the type of communication network in which the access device 121 is deployed. The access device 121 may be a wired access device or a wireless access device. The access device 121 may be implemented as various node types, incorporate various node types, incorporate functions supported by various node types, or the like, as well as various combinations thereof. It will be appreciated that such node types and associated functions may vary for different types of communication networks in which the network device is deployed. For example, the access device 121 may be implemented as and/or incorporate functions of one or more of an optical network device (e.g., an optical network terminal (ONT) or other optical network device), a cellular access device (e.g., a base station, such as a NodeB in a 3G network, an Evolved NodeB (eNodeB) in a 4G network, a gNodeB in a 5G network, or the like), a WiFi access device (e.g., a WiFi access point (AP) or other WiFi access device), or the like, as well as various combinations thereof.

The network device 122 may be configured to provide subscriber and traffic management functions for fixed and/or wireless networks. For example, such subscriber and traffic management functions may include features to have subscriber identity, subscriber policy context, subscriber and traffic policy enforcement options, or the like, as well as various combinations thereof. For example, such subscriber and traffic management functions may include traffic management based on traffic management policies, where such traffic management policies may include Layer 2 (L2)-Layer 4 (L4) traffic management policies (e.g., subscriber traffic management policies, bearer traffic management policies, or the like, as well as various combinations thereof), Layer 4 (L4)-Layer 7 (L7) traffic management policies (e.g., flow-aware traffic management policies, application-aware traffic management policies, or the like, as well as various combinations thereof) which may be based on deep packet inspection (DPI) (e.g., using DPI with stateful flow awareness) and/or other traffic analysis using ML techniques, or the like, as well as various combinations thereof. The network device 122 may be configured to support congestion management functions, including sampled subscriber congestion control.

The network device 122 may be implemented in various ways, which may depend on the type of communication network in which the network device 122 is deployed. The network device 122 may be a service router. The network device 122 may be implemented as various node types, incorporate various node types, incorporate functions supported by various node types, or the like, as well as various combinations thereof. It will be appreciated that such node types and associated functions may vary for different types of communication networks in which the network device is deployed. For example, the network device 122 may be implemented as and/or incorporate functions of one or more of a Broadband Network Gateway (BNG), a wireless local area network (LAN) gateway (WLGW), a Packet Data Network (PDN) Gateway (PGW) in a 4G network, a Third Generation Partnership Project (3GPP) User Plane Function (UPF) in a 5G network, or the like, as well as various combinations thereof.

The extended services appliance 123 may be configured to provide various services for the network device 122 and, thus, for traffic flows for subscriber devices 112 of subscribers 111 which are traversing the network device 122. For example, the extended services appliance 123 may be configured to provide flow-aware services, application-aware services, or the like, as well as various combinations thereof. For example, the extended services appliance 123 may support services such as firewall services, encryption/decryption services, congestion detection and mitigation services, or the like, as well as various combinations thereof. It will be appreciated that the extended services appliance 123 may support various other services which may be provided for the network device 122 and, thus, for traffic flows for subscriber devices 112 of subscribers 111 which are traversing the network device 122.

The extended services appliance 123 may provide services for the network device 122, and the traffic flows for subscriber devices 112 of subscribers 111 which are traversing the network device 122, in various ways, which may depend on the types of traffic flows being supported, the types of services being provided, or the like, as well as various combinations thereof. For example, the extended services appliance 123 may provide at least some such services by receiving traffic flows of the subscriber devices 112 which are redirected by the network device 122 to the extended services appliance 123, operating on the traffic flows of the subscriber devices 112, and then returning the traffic flows of the subscriber devices 112 to the network device 122 for further handling of the traffic flows of the subscriber devices 112. For example, the extended services appliance 123 may provide at least some such services by receiving information about traffic flows of the subscriber devices 112 from the network device 122, determining service-related information for the traffic flows of the subscriber devices 112 based on the information about the traffic flows of the subscriber devices 112, and providing the service-related information for the traffic flows of the subscriber devices 112 to the network device 122 for use by the network device to support further handling of the traffic flows of the subscriber devices 112. It will be appreciated that the extended services appliance 123 may provide services for the network device 122, and the traffic flows for subscriber devices 112 of subscribers 111 which are traversing the network device 122, in various other ways.

It will be appreciated that the extended services appliance 123, although depicted as a standalone, centralized element, may be implemented in various other ways, such as in a centralized manner as a portion of a different element (e.g., as a discrete element or subsystem of the network device 122), in a distributed manner (e.g., as part of one or more of the access device 121, the network device 122, and/or the extended services appliance 123 and/or other network devices which may be deployed within the communication network 120), or the like.

The policy manager 125 is configured to support management of policies which may be used to provide various management functions for the communication network. The policy manager 125 may be configured to determine policies to be deployed within the communication network 120 for supporting management of the communication network 120, to deploy policies to elements of the communication network 120 for supporting management of the communication network 120, or the like, as well as various combinations thereof. The policy manager 125 may be configured to support determination and deployment of management policies based on various inputs, such as feedback from elements of the communication network 120, information from one or more management systems associated with management of the communication network 120, or the like, as well as various combinations thereof. The policy manager 125 may be configured to support management of various types of management policies, such as traffic management policies, congestion management policies, or the like, as well as various combinations thereof. The policy manager 125 may be configured to support congestion management functions, including sampled subscriber congestion control.

The policy manager 125 may be implemented in various ways, which may depend on the type of communication network in which the policy manager 125 is deployed. The policy manager 125 may be implemented as various node types, incorporate various node types, incorporate functions supported by various node types, or the like, as well as various combinations thereof. It will be appreciated that such node types and associated functions may vary for different types of communication networks in which the network device is deployed. For example, the policy manager 125 may be implemented as and/or incorporate functions of one or more of a Radius Authentication, Authorization, and Accounting (AAA) server, a Policy and Charging Rules Function (PCRF) in a 4G network, a Policy Control Function (PCF) in a 5G network, an embedded policy decision manager integrated inside a network management layer, or the like, as well as various combinations thereof.

It will be appreciated that the policy manager 125, although depicted as a standalone, centralized element, may be implemented in various other ways, such as in a centralized manner as a portion of a different element (e.g., as a discrete element or subsystem of the network device 122 or the extended services appliance 123), in a distributed manner (e.g., as part of one or more of the access device 121, the network device 122, and/or the extended services appliance 123 and/or other network devices which may be deployed within the communication network 120), or the like.

It will be appreciated that, although primarily presented herein as being implemented as standalone elements, one or more of the elements of the communication network 120 may be implemented in various other ways, such as by splitting functions of an element across multiple elements (e.g., distributing functions of an element across subsystems of other elements), combining multiple functions of multiple elements into a common element (e.g., implementing functions of the multiple elements as subsystems of a common element), or the like, as well as various combinations thereof. Accordingly, it will be appreciated that the various elements presented herein may be implemented such that any of the functions presented herein as being performed by a particular element may be implemented by any other elements depending on the manner in which the various functions are distributed and/or centralized into various elements and systems.

Figure 2:
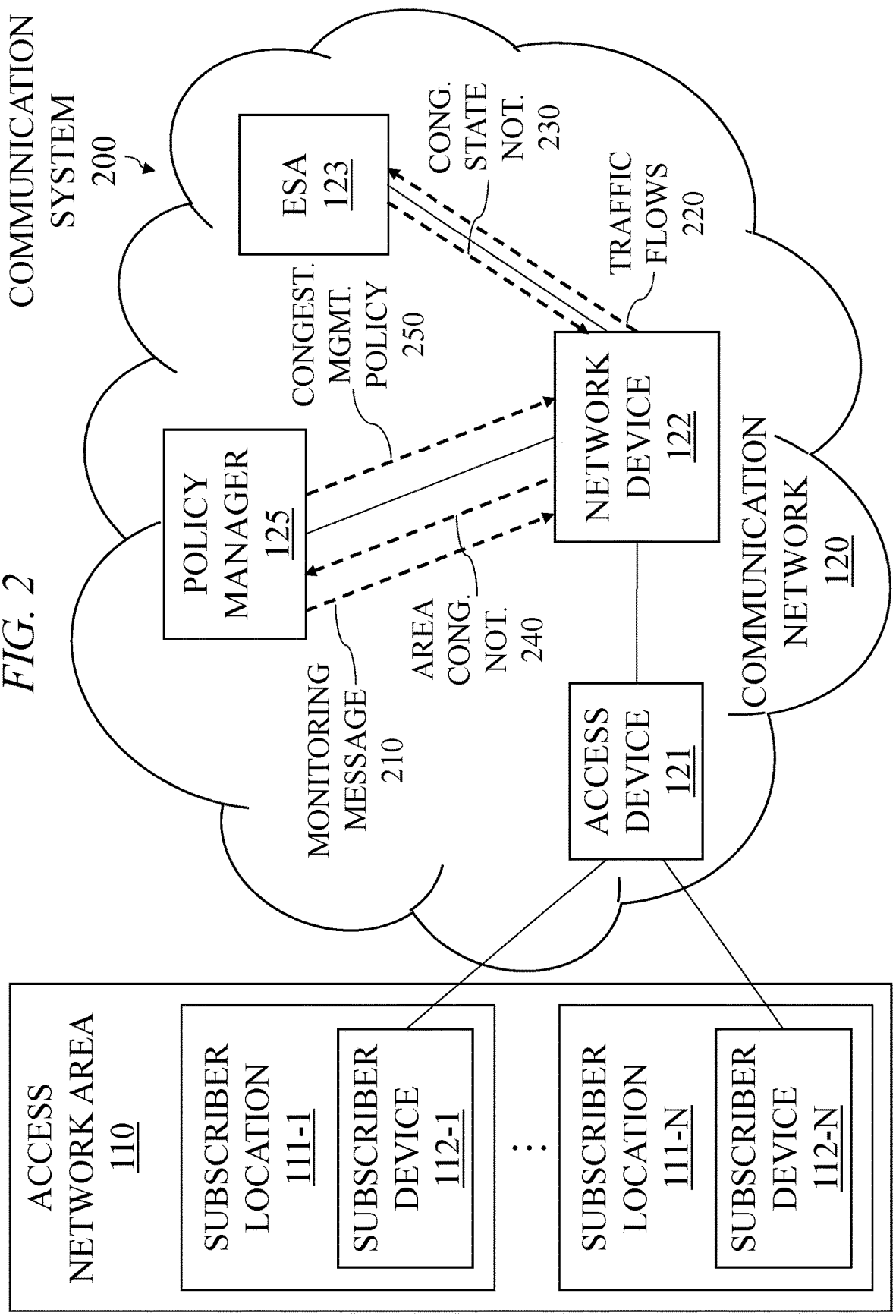
FIG. 2 depicts an example embodiment of subscriber sampled congestion control within the context of the communication system of FIG. 1.

It will be appreciated that various example embodiments for supporting subscriber sampled congestion control within the context of the communication system of FIG. 1 may be further understood by way of reference to FIG. 2.

FIG. 2 depicts an example embodiment of subscriber sampled congestion control within the context of the communication system of FIG. 1.

The communication system 200 is identical to the communication system 100 of FIG. 1, with further indications of messages exchanged between the elements for supporting subscriber sampled congestion control within the context of the communication system 100 of FIG. 1.

The policy manager 125 selects a subset of the subscriber devices 112 of the access network area 110 as the subscriber devices 112 to be monitored for congestion. The subscriber devices 112 to be monitored for congestion will be monitored for congestion as a basis for determining whether to activate congestion control for the access network area 110. In at least some example embodiments, the subscriber devices 112 to be monitored for congestion may include only a relatively small subset of the full set of subscriber devices 112 of the access network area 110 and/or represent only a relatively small subset of the traffic associated with the full set of subscriber devices 112 of the access network area 110 so as to limit the relatively costly monitoring that is applied by the network device 122 and the extended services appliance 123 for controlling activation of congestion control for the access network area 110. In other words, the subscriber devices 112 to be monitored for congestion will essentially be used as a relatively inexpensive barometer for the congestion state of access network area 110 and, thus, to determine whether to activate congestion control for the access network area 110. The policy manager 125, as discussed further below, may select a subset of the subscriber devices 112 of the access network area 110 as the subscriber devices 112 to be monitored for congestion in various ways.

The policy manager 125 may select the subset of the subscriber devices 112 of the access network area 110 as the subscriber devices 112 to be monitored for congestion in various ways. The policy manager 125 may select the subscriber devices 112 to be monitored for congestion in a manner for ensuring that a certain number of the subscriber devices 112 of the access network area 110 are monitored for congestion, in a manner for ensuring that a certain percentage of the subscriber devices 112 of the access network area 110 are monitored for congestion, in a manner for ensuring that a certain amount of traffic within the access network area 110 is monitored for congestion, in a manner for ensuring that a certain percentage of traffic within the access network area 110 is monitored for congestion, or the like, as well as various combinations thereof. The policy manager 125 may select, from the subscriber devices 112 of the access network area 110, the subscriber devices 112 to be monitored for congestion randomly, based on quantities of traffic associated with the subscriber devices 112 of the access network area 110, based on one or more application characteristics of the application(s) used by the subscriber devices 112 of the access network area 110, based on one or more device characteristics of the subscriber devices 112 of the access network area 110, based on one or more subscriber characteristics of the subscribers 111 associated with the subscriber devices 112 of the access network area 110, or the like, as well as various combinations thereof. It will be appreciated that, as discussed further below, various combinations of such factors may be applied for determining the number of subscriber devices 112 to be monitored for congestion and for selecting, from the subscriber devices 112 of the access network area 110 based on the number of subscriber devices 112 to be monitored for congestion, the subscriber devices 112 to be monitored for congestion.

The policy manager 125 may determine the number of subscriber devices 112 to be monitored for congestion and select, from the subscriber devices 112 of the access network area 110 based on the number of subscriber devices 112 to be monitored for congestion, the subscriber devices 112 to be monitored for congestion. For example, the policy manager 125 may determine a certain number of the subscriber devices 112 of the access network area 110 as the subscriber devices 112 to be monitored for congestion (e.g., three of the subscriber devices 112, eight of the subscriber devices 112, or the like), and then select specific subscriber devices 112 of the access network area 110 to satisfy the number (e.g., selecting specific subscriber devices 112, selecting subscriber devices 112 fitting a particular profile, selecting subscriber devices 112 to minimize traffic monitored, or the like, as well as various combinations thereof). For example, the policy manager 125 may select a certain percentage of the subscriber devices 112 of the access network area 110 as the subscriber devices 112 to be monitored for congestion (e.g., 2% of the subscriber devices 112, 5% of the subscriber devices 112, or the like), and then select specific subscriber devices 112 of the access network area 110 to satisfy the percentage (e.g., selecting specific subscriber devices 112, selecting subscriber devices 112 fitting a particular profile, selecting subscriber devices 112 to minimize traffic monitored, or the like, as well as various combinations thereof). It will be appreciated that various combinations of such factors may be applied to determine the number of subscriber devices 112 to be monitored for congestion and select, from the subscriber devices 112 of the access network area 110 based on the number of subscriber devices 112 to be monitored for congestion, the subscriber devices 112 to be monitored for congestion.

The policy manager 125 provides, to the network device 122, an indication of the subscriber devices 112 to be monitored for congestion. The policy manager 125 may provide the indication of the subscriber devices 112 to be monitored for congestion by sending a message (illustratively, monitoring message 210) including identification information identifying the subscriber devices 112 to be monitored for congestion and an indication that the identified subscriber devices 112 are to be monitored for congestion. For example, the identification information identifying the subscriber devices 112 to be monitored for congestion may include device identifiers of the subscriber devices 112 to be monitored for congestion, subscriber identifiers of the subscribers 111 associated with the subscriber devices 112 to be monitored for congestion, or the like, as well as various combinations thereof. For example, the indication that the identified subscriber devices 112 are to be monitored for congestion may include a policy to be applied by the network device 122 for triggering monitoring of the subscriber devices 112 to be monitored for congestion, an indication of a policy to be applied by the network device 122 for triggering monitoring of the subscriber devices 112 to be monitored for congestion (e.g., where policies are preloaded on the network device 122), or the like, as well as various combinations thereof.

The network device 122 receives the indication of the subscriber devices 112 to be monitored for congestion (illustratively, monitoring message 210). The network device 122, based on the indication of the subscriber devices 112 to be monitored for congestion, triggers monitoring of the subscriber devices 112 to be monitored for congestion by a congestion monitoring element configured to support congestion monitoring for the subscriber devices 112 to be monitored for congestion. The congestion monitoring element may be remote from the network device 122 (illustratively, the extended services appliance 123) or local to the network device (e.g., a congestion monitoring element disposed within the network device 122, which is omitted from FIG. 2 for purposes of clarity). In the example of FIG. 2, the network device 122 triggers monitoring of the subscriber devices 112 to be monitored for congestion by providing traffic flows of the subscriber devices 112 to be monitored for congestion to the extended services appliance 123. The network device 122 may provide the traffic flows to the extended services appliance 123 by (1) diverting the traffic flows to the extended services appliance 123 for processing and then receiving the diverted traffic flows back from the extended services appliance 123 for further forwarding toward the intended destinations of the traffic flows or (2) replicating the traffic flows to create replicated copies of the traffic flows and sending the replicated copies of the traffic flows to the extended services appliance 123 while forwarding the traffic flows toward the intended destinations of the traffic flows. This providing of the traffic flows of the subscriber devices 112 to be monitored for congestion to the extended services appliance 123 is indicated by traffic flows 220.

The extended services appliance 123 receives the traffic flows of the subscriber devices 112 to be monitored for congestion and performs congestion monitoring for the access network area 110 by performing congestion monitoring for the subscriber devices 112 to be monitored for congestion based on monitoring of the received traffic flows of the subscriber devices 112 to be monitored for congestion. The extended services appliance 123 may perform congestion monitoring for the subscriber devices 112 to be monitored for congestion using various types of congestion monitoring which may be applied to the received traffic flows of the subscriber devices 112 to be monitored for congestion (e.g., L2-L4 based congestion monitoring, L7-based flow-aware and/or application-aware congestion monitoring, or the like, as well as various combinations thereof). The extended services appliance 123 may detect congestion in the access network area 110 based on detection of congestion for one or more subscriber devices 112 to be monitored for congestion (e.g., based on a determination that at least one of the monitored subscriber devices 112 is experiencing congestion, based on a determination that a threshold number of monitored subscriber devices 112 are experiencing congestion, or the like). The extended services appliance 123, upon detection of congestion in the access network area 110 based on the monitoring of the received traffic flows of the subscriber devices 112 to be monitored for congestion, sends an indication of congestion in the access network area 110 to the network device 122 (illustratively, congestion state notification 230). The indication of congestion in the access network area 110 includes an indication of the access network area 110 with which the area congestion notification is associated (e.g., an area identifier of the access network area 110, an identifier associated with one of the subscriber devices 112 for which congestion was detected, or the like, as well as various combinations thereof), an indication of a congestion state of the access network area 110 (e.g., an indication of the congestion state itself, an indication of a state transition from an uncongested state to a congested state, or the like, as well as various combinations thereof), or the like, as well as various combinations thereof.

The network device 122 receives the indication of congestion in the access network area 110 from the extended services appliance 123 (illustratively, congestion state notification 230). The network device 122, based on the received indication of congestion in the access network area 110, sends an area congestion notification to the policy manager 125 (illustratively, area congestion notification 240). The area congestion notification may include an indication of the access network area 110 with which the area congestion notification is associated (e.g., an area identifier of the access network area 110), an indication of a congestion state of the access network area 110 (e.g., an indication of the congestion state itself, an indication of a state transition from an uncongested state to a congested state, or the like, as well as various combinations thereof), or the like, as well as various combinations thereof. In the case in which the indication of congestion in the access network area 110 from the extended services appliance 123 includes the area identifier of the access network area 110, the network device 122 may include the area identifier of the access network area 110 in the area congestion notification. In the case in which the indication of congestion in the access network area 110 from the extended services appliance 123 includes an identifier associated with one of the subscriber devices 112 for which congestion was detected (e.g., a subscriber identifier, a subscriber device identifier, or the like), the network device 122 may use the identifier associated with one of the subscriber devices 112 for which congestion was detected to determine the area identifier of the access network area 110 and include the area identifier of the access network area 110 in the area congestion notification. It will be appreciated that the network device 122 may determine the access network area 110 experiencing congestion in various other ways, may indicate the access network area 110 experiencing congestion within the area congestion notification in various other ways, or the like, as well as various combinations thereof.

The policy manager 125 receives the area congestion notification from the network device 122 (illustratively, area congestion notification 240). The policy manager 125, based on the area congestion notification from the network device 122, determines the set of affected subscriber devices 112 of the access network area 110 that may be affected by congestion in the access network area 110, selects a congestion management policy for the affected subscriber devices 112 of the access network area 110, and sends the congestion management policy for the affected subscriber devices 112 of the access network area 110 to the network device 122 (illustratively, congestion management policy 250)).

The policy manager 125 may determine the affected subscriber devices 112 of the access network area 110 in various ways. The affected subscriber devices 112 of the access network area 110 may include all of the subscriber devices 112 currently active in the access network area 110 or a subset of the subscriber devices 112 currently active in the access network area 110. In the case in which the affected subscriber devices 112 of the access network area 110 include all of the subscriber devices 112 currently active in the access network area 110, the policy manager 125 may use the area identifier of the access network area 110 to identify all of the subscriber devices 112 currently active in the access network area 110. In the case in which the affected subscriber devices 112 of the access network area 110 include a subset of the subscriber device 112 currently active in the access network area 110, the policy manager 125 may use the area identifier of the access network area 110 to identify all of the subscriber devices 112 currently active in the access network area 110 and may then identify ones of the subscriber devices 112 currently active in the access network area 110 which are currently experiencing congestion. It will be appreciated that the policy manager 125 may determine the affected subscriber devices 112 of the access network area 110 in various other ways.

The policy manager 125 may select the congestion management policy for the affected subscriber devices 112 of the access network area 110 in various ways. For example, the policy manager 125 may select the congestion management policy for the affected subscriber devices 112 of the access network area 110 based on one or more of a level of congestion detected for the access network area 110, one or more characteristics of one or more of the affected subscriber devices 112 of the access network area 110 (e.g., device types of the affected subscriber devices 112, communications technologies being used by the affected subscriber devices 112, or the like, as well as various combinations thereof), one or more characteristics of one or more of the traffic flows of affected subscriber devices 112 of the access network area 110 (e.g., the most common type of application being used, priority levels of the traffic flows, or the like, as well as various combinations thereof), one or more characteristics of the access network area 110, one or more characteristics of the communication network 120, one or more congestion control preferences of the service provider of the communication network 120, or the like, as well as various combinations thereof. It will be appreciated that the policy manager 125 may select the congestion management policy for the affected subscriber devices 112 of the access network area 110 in various other ways.

The policy manager 125 may send the congestion management policy to the network device 122 in various ways. For example, where congestion management policies which may need to be applied by the network device 122 are not pre-stored on the network device 122 by the policy manager 125, the policy manager 125 may send the congestion management policy to the network device 122 by including the congestion management policy within a message that is sent to the network device 122. For example, where the congestion management policies which may need to be applied by the network device 122 are pre-stored on the network device 122 by the policy manager 125, the policy manager 125 may send the congestion management policy to the network device 122 by including an indication of the congestion management policy within a message that is sent to the network device 122. It will be appreciated that the policy manager 125 may send the congestion management policy to the network device 122 in various other ways.

The network device 122 receives the congestion management policy from the policy manager 125 (illustratively, congestion management policy 250). The network device 122 performs congestion management for the affected subscriber devices 112 of the access network area 110 based on the congestion management policy from the policy manager 125. The network device 122 may perform congestion management for the affected subscriber devices 112 of the access network area 110, based on the congestion management policy, on a per subscriber device basis. The congestion management may include L2-L4 congestion management (e.g., L2-L4 shaping. L2-L4 queuing, or the like, as well as various combinations thereof). The congestion management may include L7 congestion management (e.g., flow-aware-based congestion control, application-aware congestion control), or the like, as well as various combinations thereof. The L7 congestion management may be performed by diverting the traffic flows of the affected subscriber devices 112 of the access network area 110 to an application assurance element configured to apply L7 congestion control. The network device 122 may be configured to perform various other congestion control functions for the affected subscriber devices 112 of the access network area 110 based on the congestion management policy from the policy manager 125.

It will be appreciated that, although omitted for purposes of clarity, a reverse process may be implemented for deactivating congestion control for the access network area 110.

In at least some example embodiments, the above-described process for providing subscriber sampled congestion control may be implemented as follows. The policy manager 125 selects a subset of subscribers 111 per area/ULI to divert all or part of their traffic to an extended services appliance virtual machine configured to support application assurance by assigning an application profile to those subscribers. Here, it is recommended that at least a few subscribers 111 per unique ULI be selected: however, it will be appreciated that the selection of subscribers may be performed such that only a tiny subset of overall traffic volume of the access network area 110 is diverted for congestion monitoring. An application assurance dynamic experience management access-network-location mode monitors a 3GPP ULI passed to an application assurance element and detects a congestion state for each unique ULI/area. When the congestion state changes, the application assurance element notifies the policy manager (e.g., PCRF via Gx event) of the ULI congestion state. The policy manager looks up the set of affected subscribers on that area/ULI and pushes congestion control policy changes to the BNG for each of the affected subscribers. There may be tiers of different subscriber policies during congestion. The BNG may then implement a congestion management traffic policy on a per-subscriber basis (e.g., using a QoS policy (e.g., L2-L4 shaping/queuing), diverting ULI congested subscribers to the application assurance element and using application assurance AQP for an application-aware policy, or the like, as well as various combinations thereof). The same process may then be used to change the policy back to normal when each ULI congestion state is relieved.

Figure 3:
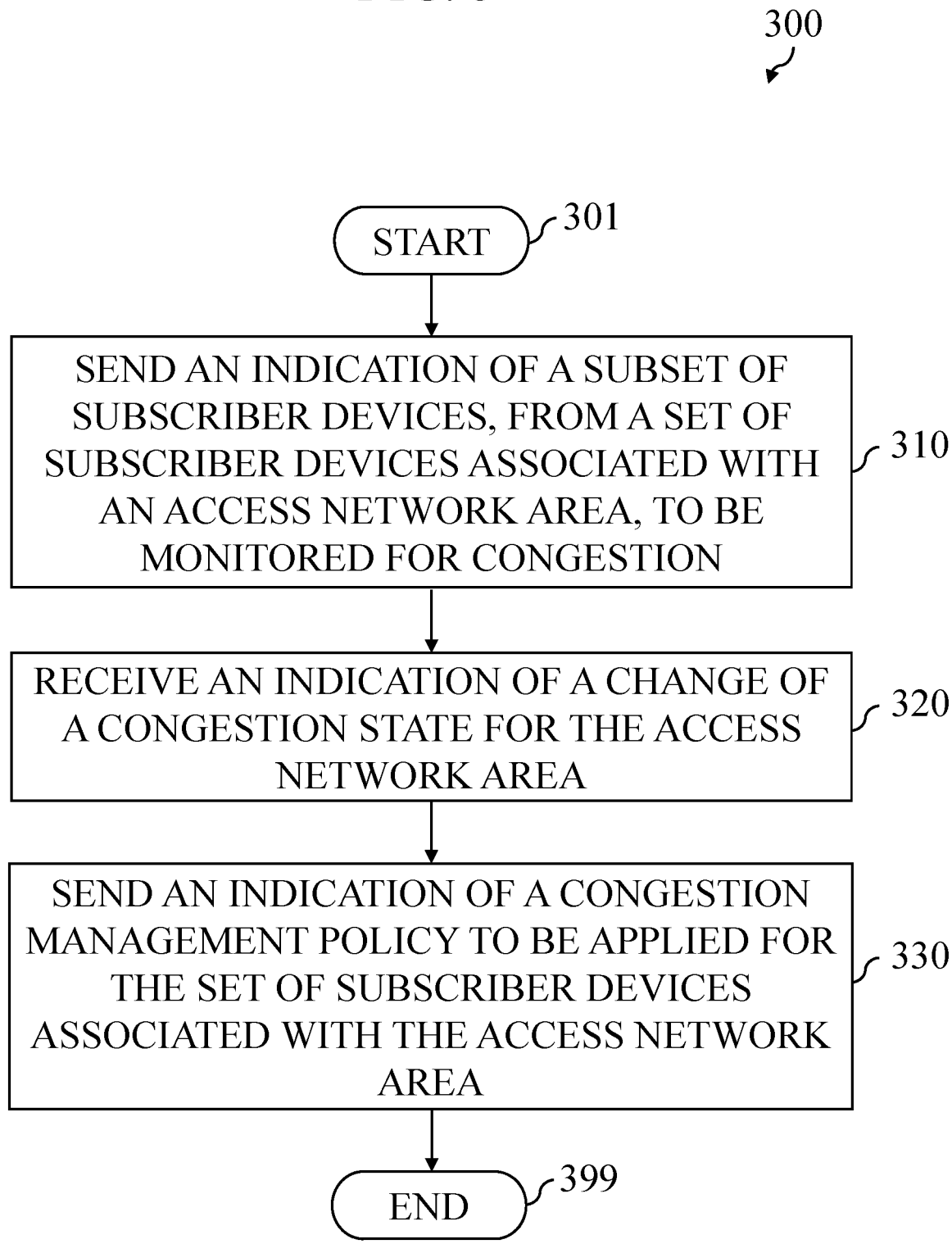
FIG. 3 depicts an example embodiment of method for use by a policy manager for supporting subscriber sampled congestion control.

FIG. 3 depicts an example embodiment of method for use by a policy manager for supporting subscriber sampled congestion control. It will be appreciated that, although primarily presented herein as being performed serially, at least a portion of the functions of method 300 may be performed contemporaneously or in a different order than as presented in FIG. 3. At block 301, the method 300 begins. At block 310, send an indication of a subset of subscriber devices, from a set of subscriber devices associated with an access network area, to be monitored for congestion. At block 320, receive an indication of a change of a congestion state for the access network area. At block 330, send an indication of a congestion management policy to be applied for the set of subscriber devices associated with the access network area. At block 399, the method 300 ends. It will be appreciated that various other functions presented herein as being supported by a policy manager (e.g., policy manager 125) may be provided within the context of the method 300 of FIG. 3.

Figure 4:
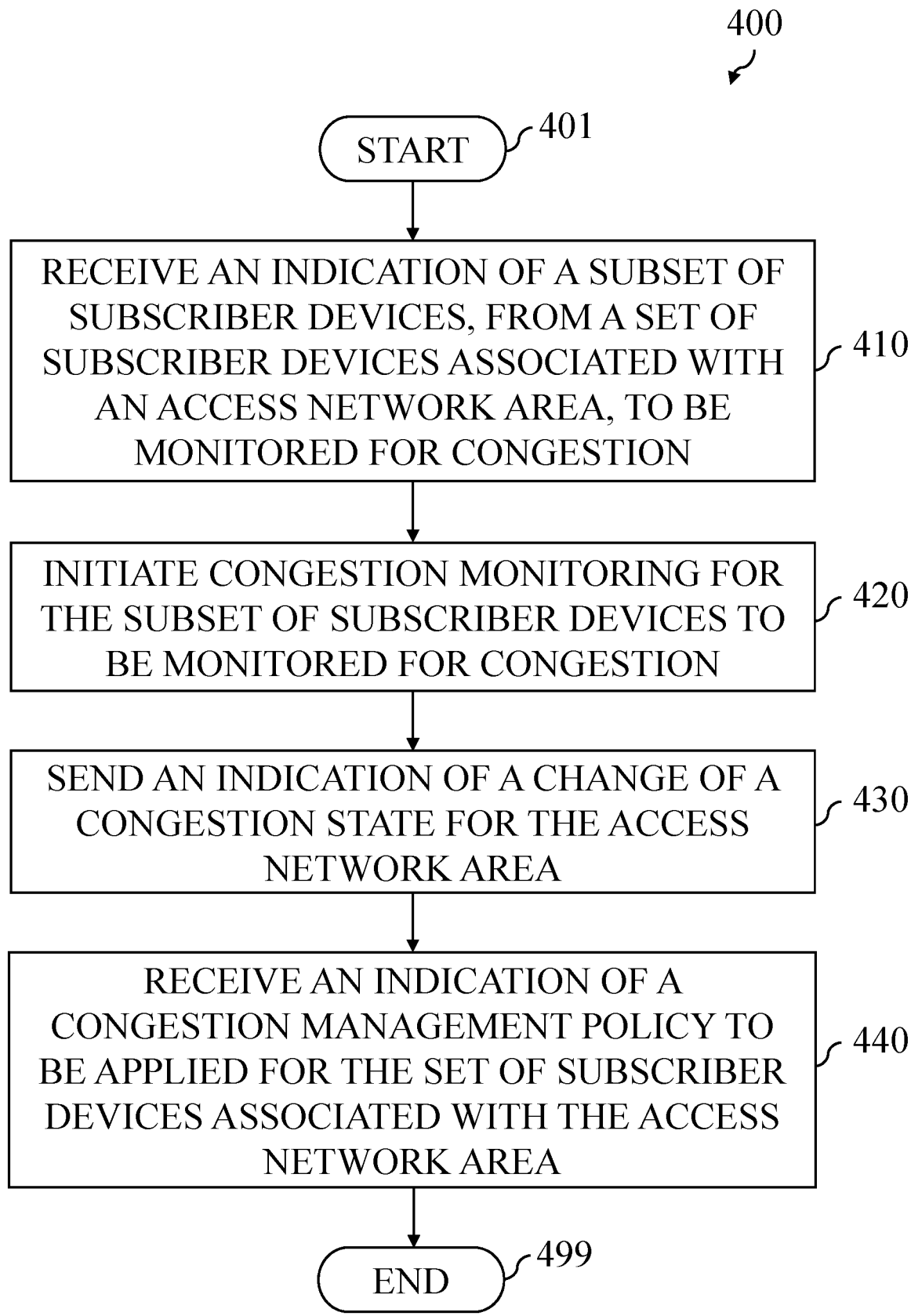
FIG. 4 depicts an example embodiment of method for use by a network device for supporting subscriber sampled congestion control.

FIG. 4 depicts an example embodiment of method for use by a network device for supporting subscriber sampled congestion control. It will be appreciated that, although primarily presented herein as being performed serially, at least a portion of the functions of method 400 may be performed contemporaneously or in a different order than as presented in FIG. 4. At block 401, the method 400 begins. At block 410, receive an indication of a subset of subscriber devices, from a set of subscriber devices associated with an access network area, to be monitored for congestion. At block 420, initiate congestion monitoring for the subset of subscriber devices to be monitored for congestion. At block 430, send an indication of a change of a congestion state for the access network area. At block 440, receive an indication of a congestion management policy to be applied for the set of subscriber devices associated with the access network area. At block 499, the method 400 ends. It will be appreciated that various other functions presented herein as being supported by a network device (e.g., network device 122) may be provided within the context of the method 400 of FIG. 4.

Figure 5:
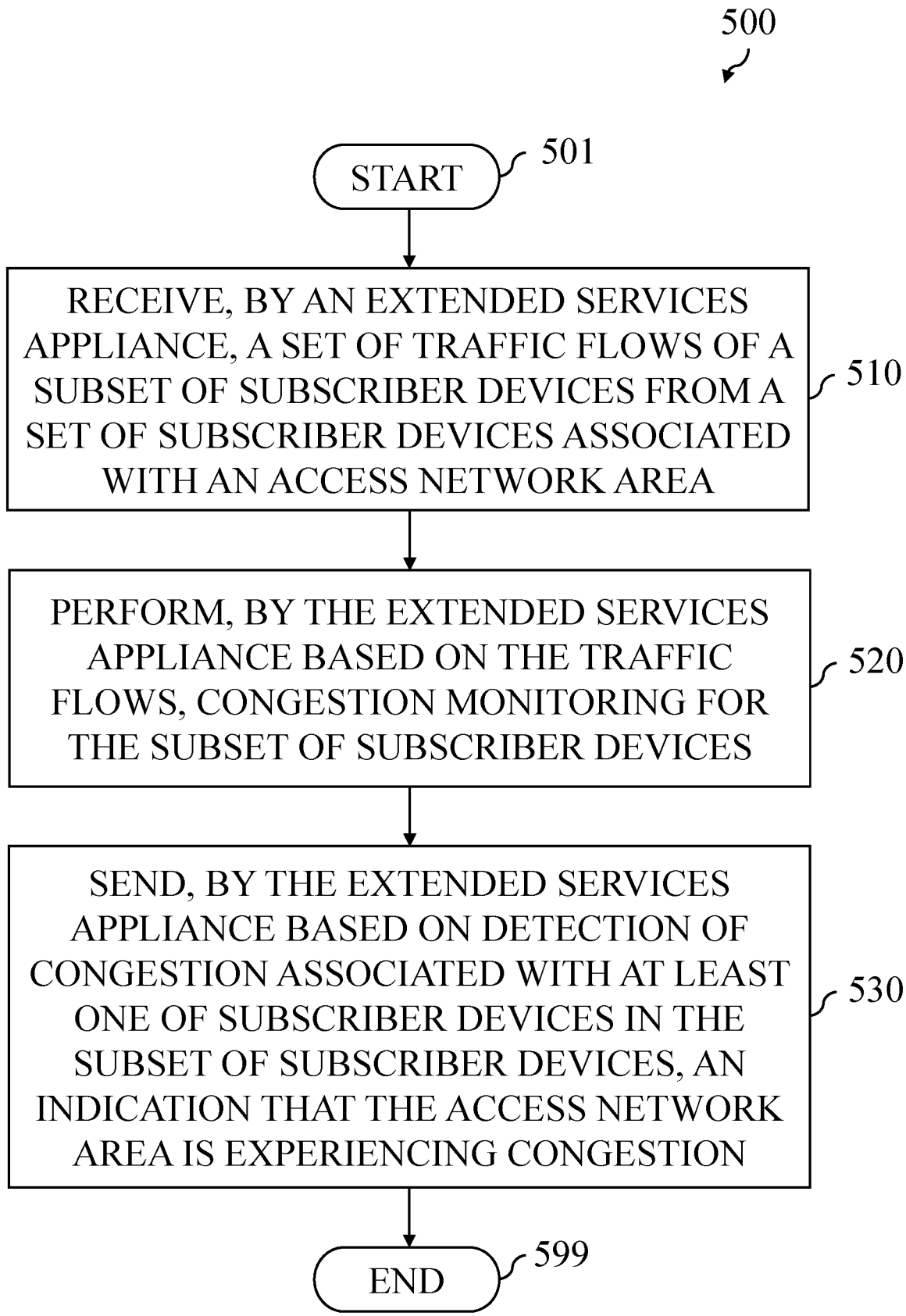
FIG. 5 depicts an example embodiment of method for use by an extended services appliance for supporting subscriber sampled congestion control.

FIG. 5 depicts an example embodiment of method for use by an extended services appliance for supporting subscriber sampled congestion control. It will be appreciated that, although primarily presented herein as being performed serially, at least a portion of the functions of method 500 may be performed contemporaneously or in a different order than as presented in FIG. 5. At block 501, the method 500 begins. At block 510, receive, by an extended services appliance, a set of traffic flows of a subset of subscriber devices from a set of subscriber devices associated with an access network area. At block 520, perform, by the extended services appliance based on the traffic flows, congestion monitoring for the subset of subscriber devices. At block 530, send, by the extended services appliance based on detection of congestion associated with at least one of subscriber devices in the subset of subscriber devices, an indication that the access network area is experiencing congestion. At block 599, the method 500 ends. It will be appreciated that various other functions presented herein as being supported by an extended services appliance (e.g., extended services appliance 123) may be provided within the context of the method 500 of FIG. 5.

Various example embodiments for supporting subscriber sampled congestion control may provide various advantages or potential advantages.

For example, various example embodiments for supporting subscriber sampled congestion control may be configured to provide more cost-effective congestion control in communication networks. Congestion control based on subscriber sampled congestion control may use a subset of subscriber devices and total traffic, from a shared area of an access network that may experience congestion, to measure the performance of the shared area of the access network and, thus, the congestion state of the shared access resources of the shared area of the access network. This allows congestion detection to be provided in a shared network area in a manner in which the volume of traffic to be processed is not necessarily related to the traffic volume within the shared network area and, thus, in which the cost of supporting congestion detection is not linearly related to the traffic volume within the shared network area. Further, congestion mitigation for the identified congested resources may be provided using various congestion mitigation techniques (e.g., a cost-effective L2-L4 subscriber/bearer traffic management policy, an L7 flow-aware and/or application-aware policy, or a mix of the two approaches depending on the traffic management policy preferences or needs of the operator), thereby enabling control over the cost of mitigation aspects of traffic management and, thus, further improving the cost effectiveness of subscriber sampled congestion control compared to solutions that rely solely on flow-based processing for all traffic in order to support congestion detection and mitigation.

For example, various example embodiments for supporting subscriber sampled congestion control may be configured to obviate the use of various mechanisms traditionally used for congestion control in communication networks, although it will be appreciated that some or all such congestion control mechanisms still may be applied within communication networks employing subscriber sampled congestion control. For example, various example embodiments for supporting subscriber sampled congestion control may be configured to obviate the use of DPI/flow-aware processing, which are relatively expensive (e.g., due to traffic processing costs) when compared to traffic policies that do not rely on DPI/flow-aware processing, to achieve such complex and granular traffic management. For example, various example embodiments for supporting subscriber sampled congestion control may be configured to obviate the use of smart/dynamic congestion management solutions that often rely on intensive flow-aware traffic processing of all access traffic, to identify which traffic (and, optionally, subscribers) are experiencing congestion, and that then implement flow-aware traffic control policies on all traffic or in some cases only the subset of traffic requiring control to mitigate the congestion, as the solution costs of such approaches generally are roughly proportional to the volume of traffic processed. For example, various example embodiments for supporting subscriber sampled congestion control may be configured to obviate the use of network probes to detect congestion as such solutions generally have tremendous costs in terms of input/output connectivity and external appliances.

Various example embodiments for supporting subscriber sampled congestion control may provide various other advantages or potential advantages.

Figure 6:
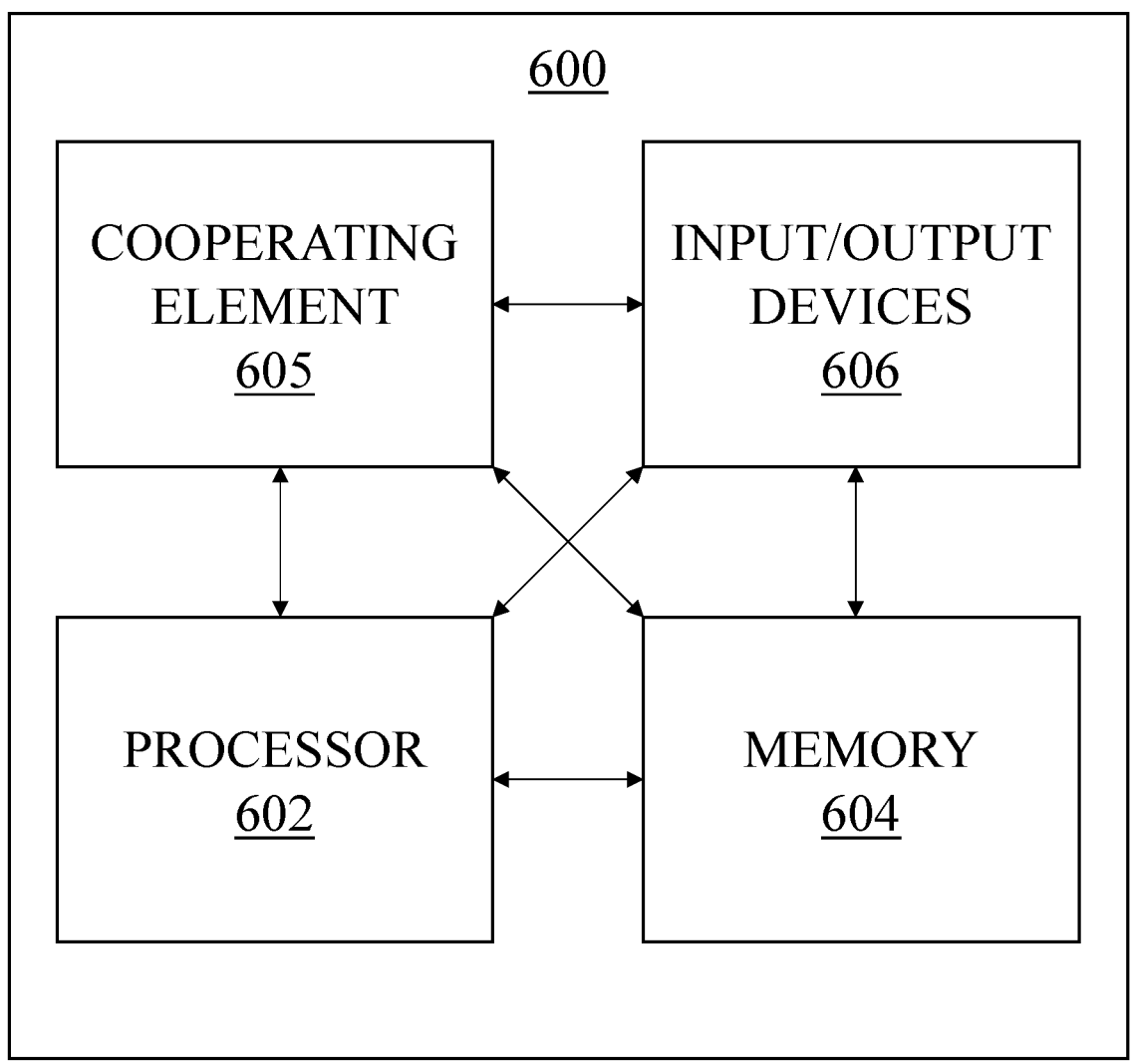
FIG. 6 depicts an example embodiment of a computer suitable for use in performing various functions presented herein.

FIG. 6 depicts an example embodiment of a computer suitable for use in performing various functions presented herein.

The computer 600 includes a processor 602 (e.g., a central processing unit (CPU), a processor, a processor having a set of processor cores, a processor core of a processor, or the like) and a memory 604 (e.g., a random access memory (RAM), a read-only memory (ROM), or the like). In at least some example embodiments, the computer 600 may include at least one processor and at least one memory storing instructions that, when executed by the at least one processor, cause the computer to perform various functions presented herein.

The computer 600 also may include a cooperating element 605. The cooperating element 605 may be a hardware device. The cooperating element 605 may be a process that can be loaded into the memory 604 and executed by the processor 602 to implement various functions presented herein (in which case, for example, the cooperating element 605 (including associated data structures) can be stored on a non-transitory computer readable medium, such as a storage device or other suitable type of storage element (e.g., a magnetic drive, an optical drive, or the like)).

The computer 600 also may include one or more input/output devices 606. The input/output devices 606 may include one or more of a user input device (e.g., a key board, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 600 may represent a general architecture and functionality suitable for implementing functional elements described herein, portions of functional elements described herein, or the like, as well as various combinations thereof. For example, computer 600 may provide a general architecture and functionality that is suitable for implementing one or more elements presented herein, such as a subscriber device 112 or a portion thereof, an access device 121 or a portion thereof, a network device 122 or a portion thereof, an extended services appliance 123 or a portion thereof, a policy manager 125 or a portion thereof, or the like.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer readable media), transmitted via a data stream in a broadcast or other signal bearing medium, and/or stored within a memory within a computing device operating according to the instructions.

It will be appreciated that the term "non-transitory" as used herein is a limitation of the medium itself (i.e., tangible, not a signal) as opposed to a limitation of data storage persistency (e.g., RAM versus ROM).

It will be appreciated that, as used herein, "at least one of <a list of two or more elements>" and "at least one of the following: <a list of two or more elements>" and similar wording, where the list of two or more elements are joined by "and" or "or", mean at least any one of the elements, or at least any two or more of the elements, or at least all the elements.

It will be appreciated that, as used herein, the term "or" refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory storing instructions which, when executed by the at least one processor, cause the apparatus at least to:
   send an indication of a subset of subscriber devices, selected from a set of subscriber devices associated with an access network area, to be monitored for congestion as representative indicators for detecting congestion conditions within the access network area, wherein the subset of subscriber devices is selected based on at least one of: a predetermined number or percentage of subscriber devices within the access network area, a predetermined percentage or quantity of total traffic volume within the access network area, or a subscriber-specific characteristic;
   receive an indication of a change of a congestion state for the access network area based on monitored traffic flows from the selected subset of subscriber devices; and
   send, based on the indication of the change of the congestion state for the access network area, an indication of a congestion management policy to be applied for the set of subscriber devices associated with the access network area.

2. The apparatus of claim 1, wherein the indication of the change of the congestion state for the access network area includes an identifier of the access network area.

3. The apparatus of claim 2, wherein the instructions, when executed by the at least one processor, cause the apparatus at least to:
   identify, based on the identifier of the access network area, the subscriber devices in the set of subscriber devices associated with the access network area.

4. The apparatus of claim 1, wherein the indication of the change of the congestion state for the access network area includes an identifier of one of the subscriber devices in the subset of subscriber devices for which congestion was detected.

5. The apparatus of claim 4, wherein the instructions, when executed by the at least one processor, cause the apparatus at least to:
   identify, based on the identifier of one of the subscriber devices in the subset of subscriber devices for which congestion was detected, the access network area.

6. The apparatus of claim 1, wherein the indication of the congestion management policy to be applied for the set of subscriber devices associated with the access location includes an indication of the access network area.

7. The apparatus of claim 1, wherein the indication of the congestion management policy to be applied for the set of subscriber devices associated with the access network area includes, for each of the subscriber devices in the set of subscriber devices associated with the access network area, a respective identifier of the respective subscriber devices in the set of subscriber devices associated with the access network area.

8. A method, comprising:
   sending an indication of a subset of subscriber devices, selected from a set of subscriber devices associated with an access network area, to be monitored for congestion as representative indicators for detecting congestion conditions within the access network area, wherein the subset of subscriber devices is selected based on at least one of: a predetermined number or percentage of subscriber devices within the access network area, a predetermined percentage or quantity of total traffic volume within the access network area, or a subscriber-specific characteristic;

receiving an indication of a change of a congestion state for the access network area based on monitored traffic flows from the selected subset of subscriber devices; and sending, based on the indication of the change of the congestion state for the access network area, an indication of a congestion management policy to be applied for the set of subscriber devices associated with the access network area.

9. An apparatus, comprising:
at least one processor; and
at least one memory storing instructions which, when executed by the at least one processor, cause the apparatus at least to:
  receive an indication of a subset of subscriber devices, selected from a set of subscriber devices associated with an access network area, to be monitored for congestion as representative indicators for detecting congestion conditions within the access network area, wherein the subset of subscriber devices is selected based on at least one of: a predetermined number or percentage of subscriber devices within the access network area, a predetermined percentage or quantity of total traffic volume within the access network area, or a subscriber-specific characteristic;
  initiate congestion monitoring for a set of traffic flows from the subset of subscriber devices to be monitored for congestion;
  send an indication of a change of a congestion state for the access network area based on the monitoring of the set of traffic flows from the subset of subscriber devices to be monitored for congestion; and
  receive, based on the indication of the change of the congestion state for the access network area, an indication of a congestion management policy to be applied for the set of subscriber devices associated with the access network area.

10. The apparatus of claim 9, wherein, to initiate congestion monitoring for the subset of subscriber devices to be monitored for congestion, the instructions, when executed by the at least one processor, cause the apparatus at least to:
  divert, toward a congestion monitoring element, the set of traffic flows of the subset of subscriber devices to be monitored for congestion.

11. The apparatus of claim 10, wherein the apparatus comprises a network device, wherein the congestion monitoring element is disposed on the network device.

12. The apparatus of claim 10, wherein the apparatus comprises a network device, wherein the congestion monitoring element includes an extended services appliance associated with the network device.

13. The apparatus of claim 9, wherein the indication of the subset of subscriber devices to be monitored for congestion is received from a policy manager, wherein the indication of the change of the congestion state for the access network area is sent toward the policy manager, wherein the indication of the congestion management policy to be applied for the set of subscriber devices associated with the access network area is received from the policy manager.

14. The apparatus of claim 13, wherein the policy manager comprises at least one of a policy and charging rules functions, an authentication, authorization, and accounting server, or a policy decision engine of a network management layer or a subscriber management platform.

15. The apparatus of claim 9, wherein the instructions, when executed by the at least one processor, cause the apparatus at least to:
  perform at least one congestion control function for at least one of the subscriber devices in the set of subscriber devices associated with the access network area.

16. The apparatus of claim 9, wherein the congestion management policy includes at least one of a traffic management policy, a bearer management policy, a flow-aware management policy, or an application-aware management policy.

17. An apparatus, comprising:
at least one processor; and
at least one memory storing instructions which, when executed by the at least one processor, cause the apparatus at least to:
  receive, by an extended services appliance, a set of traffic flows of a subset of subscriber devices selected, from a set of subscriber devices associated with an access network area, as representative indicators for detecting congestion conditions within the access network area, wherein the subset of subscriber devices is selected based on at least one of: a predetermined number or percentage of subscriber devices within the access network area, a predetermined percentage or quantity of total traffic volume within the access network area, or a subscriber-specific characteristic;
  perform, by the extended services appliance based on the traffic flows, congestion monitoring for the subset of subscriber devices; and
  send, by the extended services appliance based on detection of congestion associated with at least one of the subscriber devices in the subset of subscriber devices, an indication that the access network area is experiencing congestion.

18. The apparatus of claim 17, wherein the congestion monitoring includes at least one of L2-L4-based monitoring or L7-based monitoring.

19. The apparatus of claim 17, wherein the indication that the access network area is experiencing congestion includes an identifier of the access network area and a congestion detected indicator configured to indicate that the access network area is experiencing congestion.

* * * * *